P. M. MARKO.
STORAGE BATTERY.
APPLICATION FILED MAR. 8, 1910.

964,995.

Patented July 19, 1910.

WITNESSES:
Geo N Naylor
John K Brachwogel

INVENTOR
Paul Max Marko
BY
Munn & Co.
ATTORNEYS

UNITED STATES PATENT OFFICE.

PAUL MAX MARKO, OF NEW YORK, N. Y.

STORAGE BATTERY.

964,995.   Specification of Letters Patent.   Patented July 19, 1910.

Application filed March 8, 1910. Serial No. 547,970.

*To all whom it may concern:*

Be it known that I, PAUL MAX MARKO, a citizen of the United States, and a resident of the city of New York, borough of Brooklyn, in the county of Kings and State of New York, have invented a new and Improved Storage Battery, of which the following is a full, clear, and exact description.

This invention relates to storage batteries having associated therewith means whereby the strength of the batteries can readily be ascertained without the use of other instruments, attachments or connections, and has reference more particularly to a storage battery with which an electric meter is associated, and which has a socket plate provided with means for electrically connecting a shunt with the meter, and in which the socket plate carries a resistance for use with the meter.

The object of the invention is to provide a simple and efficient storage battery, having a self-contained electric meter by means of which the strength of current in the battery can be ascertained at any time, which is so constructed that the meter can be easily removed from the battery without disturbing the shunt connections for conducting current to the meter, and in which a resistance is provided for use with the meter.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1:
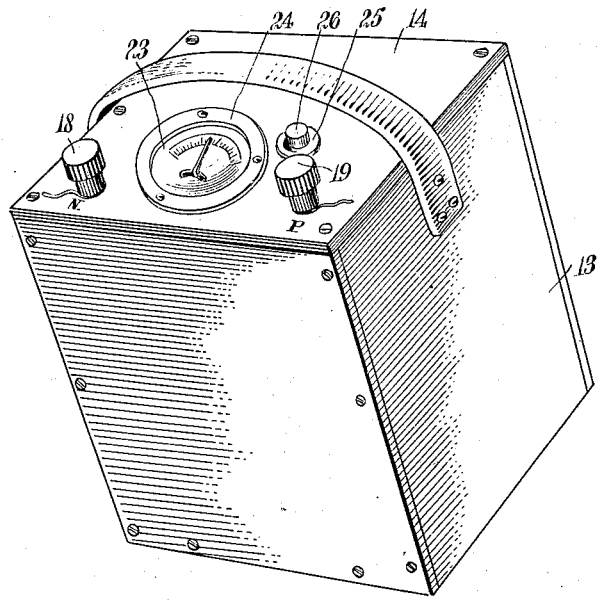
Figure 2:
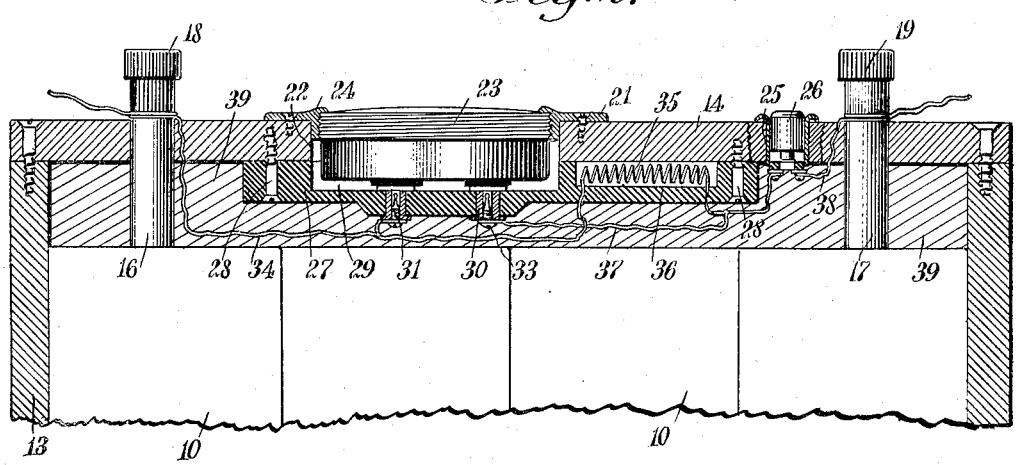
Figure 3:
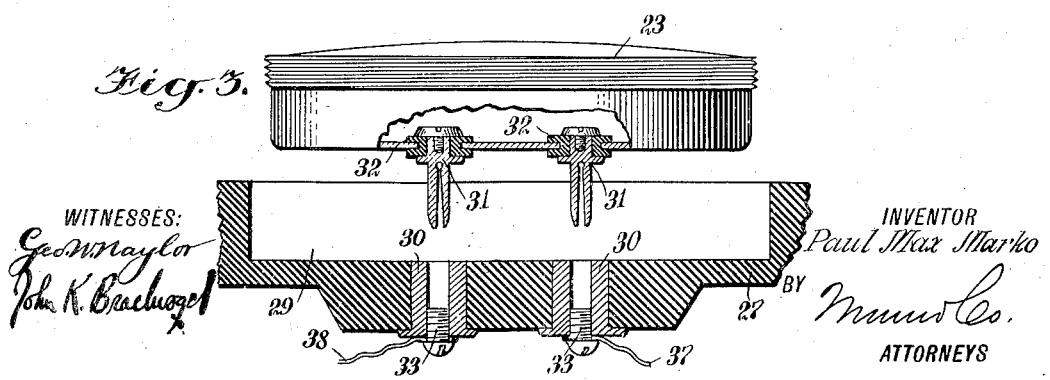

Figure 1 is a perspective view of an embodiment of my invention; Fig. 2 is an enlarged transverse section of the upper part of a storage battery having my invention applied thereto; and Fig. 3 is an enlarged fragmentary section showing part of the socket plate by means of which the meter is electrically connected with the shunt in the battery, and showing the meter with a part broken away.

Before proceeding to a more detailed explanation of my invention, it should be understood that the present form of the device constitutes an improvement upon the storage battery disclosed in my United States Patent No. 945,564, dated January 4, 1910. In the earlier form of the device, the conductors constituting the shunt by means of which the meter is supplied with current, are connected directly to the terminals of the meter, and consequently, it is difficult to remove the latter without breaking the conductors, or otherwise disturbing the battery. In the present form of my invention, I provide a socket plate having terminals with which the shunt wires are connected, and which are adapted to receive connection plugs of the meter. This construction permits the meter to be removed without disturbing the other electrical connections in any way. The socket plate also provides means for suitably holding and insulating a resistance which forms part of the shunt, and which is used in connection with the meter. The socket plate also serves as a guard, to protect the meter from injury by the acids or gases employed in, or escaping from, the cells of the battery. As in the former type of my invention, the electric meter is normally out of circuit, so that it is unaffected by the charging or discharging of the battery. A push button is provided, so that the shunt circuit can be closed at any moment, to permit a reading to be taken on the meter. The latter is so constructed that it is specially adapted for use with the battery, and its range need not exceed the capacity of the battery.

Certain of the details of construction form no part of the invention, and can be varied in accordance with individual preference and special conditions, without departing from the underlying spirit of the invention.

Referring more particularly to the drawings, in the specific form illustrated I employ a number of battery cells 10, arranged side by side, and inclosed in a box or casing 13, having a top 14, screwed or otherwise fastened upon the casing. The top may be hinged, or may have a removable closure to give access to the interior of the casing. The battery plates of the several cells are provided with suitable terminals, two only of which, extend through the top of the casing. As is shown, a negative terminal 16 of one of the cells extends through the top 14, and a positive terminal 17 of another cell also extends through the top. The cells are connected in series in the usual manner. The terminals 16 and 17, at their outer ends constitute binding posts, and are provided with thumb-nuts 18 and 19, by means of which wires can be connected to the battery.

In the top 14 of the casing I provide an opening 22 which is of substantially the size of a small electric meter 23. This electric meter is preferably a volt meter, and may be secured in place in any suitable manner, as for instance, by threaded engagement with a collar 24. The meter is inserted in the opening, so that its upper surface lies in approximately one plane with the upper surface of the top 14. The threaded collar 24 is secured to the top in any suitable manner, for example, by means of a laterally extended flange 21, which is fastened to the top by means of screws or the like. Adjacent to the meter, and also extending through an opening of the top is a circuit closer, preferably in the form of an insulating plug 25, having a push button 26.

I employ a socket plate or member 27, fashioned from indurated fiber, hard rubber, or any other suitable insulating material. It is fastened to the under side of the cover by means of screws 28 or the like, and underneath the meter 23 has a socket or recess 29 into which the meter can extend. At the recess 29, the plate has openings in which are positioned contact sleeves 30 adapted to receive contact-making plugs 31 of the meter. These are of any suitable form, and, as shown, for example, herewith, are preferably split, so that when they are forced into the sleeves they tend to bind resiliently therein and thereby insure thorough electrical connection between the sleeves and the plugs 31. The plugs are fastened to the meter casing in any suitable manner, for example, by means of insulating rings 32. Binding screws 33 are located in the lower threaded ends of the sleeves 30, and serve for the attachment of wires or other conductors to the sleeves. A wire 34 extends from the terminal 16 to one of the plugs 30, and beyond the same, to a resistance coil 35 located in a suitable pocket 36 of the member 28. A second wire 37 extends from the other contact sleeve 30 to the opposite end of the resistance 35 and thence to a terminal of the circuit closer. A wire 38 extends from the other terminal of the circuit closer to the terminal 17.

The push button of the circuit closer is normally held in a raised position, so that the terminals of the circuit closer are not electrically connected. By forcing the push button inward, the circuit is closed, and current flows between the terminals 16 and 17, through the shunt formed by the conductors 34 and 37, and thus is supplied to the meter.

The coil 35 offers a resistance which is substantially equal to the resistance of the work which the battery is intended to perform, that is, if the battery is designed for use on the ignition system of an internal combustion engine, the resistance is constructed in accordance therewith, so that when there is no load on the battery and the button is pushed to close the circuit through the meter, a load would be placed on the battery substantially equal to working condition. Hence, when it is desired to ascertain the strength of the battery, it is only necessary to press down the push button, and the short circuit formed through the volt meter from the terminal 16 to the terminal 17, causes the voltage of the battery to be immediately indicated by the needle of the meter. The latter is preferably calibrated in accordance with the size of the battery and the purposes for which it is to be employed.

If so desired, the space 39 between the tops of the cells, and the under surface of the top of the casing and the socket plate 27, is filled with a mass of wax or other similar or suitable material. This wax completely covers and insulates all of the conductors 34, 37 and 38, as well as the inner surfaces of the circuit closer. Furthermore, it prevents the connections from accidentally loosening, and aids in holding the cells in place.

Having thus described my invention, I claim as new, and desire to secure by Letters Patent:

1. In combination, a storage battery cell having positive and negative terminals, a casing inclosing said cell and having an opening, an electric meter mounted in said opening, a member secured to the inner surface of the wall of said casing and extending across said opening to form a closure therein, said member having terminals, and electrical connections between said first-mentioned terminals and said terminals of said member, said electric meter adapted to form electrical contacts with said terminals of said member.

2. In combination, a storage battery cell having a positive terminal and a negative terminal, a casing inclosing said cell and having an opening, a plate secured to the inner surface of the casing and serving as a closure for the opening, an electric meter disposed within said opening, and normally open electrical connections from each of said terminals to said meter.

3. In combination, a storage battery cell having a positive terminal and a negative terminal, a casing inclosing said cell and having an opening, a plate secured to the inner surface of the casing and serving as a closure for the opening, an electric meter disposed within said opening, normally open electrical connections from each of said terminals to said meter, and filling material between said plate and said cell and having said connections concealed therein and prevented from access to said opening by said plate.

4. In combination, a storage battery cell having a positive terminal and a negative terminal, a casing inclosing said cell, a plate within said casing and supported by one wall thereof and having a recess or pocket in the surface thereof toward said wall, a resistance within said pocket, an electric meter, and electrical connections between said terminals, said resistance and said meter.

5. In combination, a storage battery cell having a positive terminal and a negative terminal, a casing inclosing said cell, a plate within said casing and supported by one wall thereof and having a recess or pocket in the surface thereof toward said wall, a resistance within said pocket, an electric meter, normally open connections for connecting said resistance and said meter in parallel between said terminals and a filling material inserted in plastic form between said plate and said cell for retaining the cell in position and supporting and concealing said connections.

6. In combination, a storage battery cell having a positive and a negative terminal, a casing inclosing said cell and having an opening therein, a plate of insulating material within said casing and serving as a closure for the inner end of said opening and having a pocket or recess therein at one side of said opening, a resistance within said pocket, an electric meter within said opening, normally open connections for connecting said resistance and said meter in parallel between said terminals and a filling material inserted in plastic form between said plate and said cell for retaining the cell in position and supporting and concealing said connections.

7. In combination, a storage battery cell having a positive terminal and a negative terminal, a casing inclosing said cell, a plate of insulating material secured to one wall of said casing, an electric meter connected to said plate, a resistance carried by said plate, and normally open connections for connecting said resistance and said meter in parallel between said terminals.

In testimony whereof I have signed my name to this specification in the presence of two subscribing witnesses.

PAUL MAX MARKO.

Witnesses:
   HERMAN HENRY KEMPF,
   PHILIP D. ROLLHAUS.